United States Patent
Yamanishi et al.

[11] 4,006,485
[45] Feb. 1, 1977

[54] LUMINANCE CONTROLLED INDICATOR IN CAMERA VIEW FINDER

[75] Inventors: Akio Yamanishi, Tondabayashi; Mashio Kitaura, Osaka, both of Japan

[73] Assignee: Minolta Camera Kabushiki Kaisha, Osaka, Japan

[22] Filed: May 27, 1975

[21] Appl. No.: 581,305

Related U.S. Application Data

[63] Continuation of Ser. No. 406,745, Oct. 15, 1973, abandoned.

[30] Foreign Application Priority Data

Oct. 19, 1972  Japan .......................... 47-104924

[52] U.S. Cl. ............................... 354/53; 250/205; 354/60 A; 354/60 L
[51] Int. Cl.² ...................... G03B 17/20; G01J 1/32
[58] Field of Search ............ 250/205, 210; 354/53, 354/60 R, 60 E, 60 L, 60 A; 340/221; 356/226

[56] References Cited

UNITED STATES PATENTS 3,366,834   1/1968   Potter .............................. 250/205
3,473,084   10/1969  Dodge .............................. 250/205

Primary Examiner—Joseph W. Hartary
Assistant Examiner—J. A. LaBarre
Attorney, Agent, or Firm—Wolder & Gross

[57] ABSTRACT

An automatically light adjusted luminous indicator observable through a camera view finder includes a photoconductor exposed to the camera incident light and either constitutes or controls the resistance component of a frequency controlling RC network of a relaxation oscillator. The output of the relaxation oscillator controls a bi-stable multivibrator whose output is coupled through a switching transistor to the primary of a transformer whose secondary is connected to a light emitting member such as an electroluminescent device or a light emitting diode. The parameters of the network are adjusted so that the luminosity of the indicator and viewed image are about equal or within any desired ratio range. The photoconductor may also control an exposure control network.

16 Claims, 7 Drawing Figures

RECTANGULAR WAVE CONVERTOR

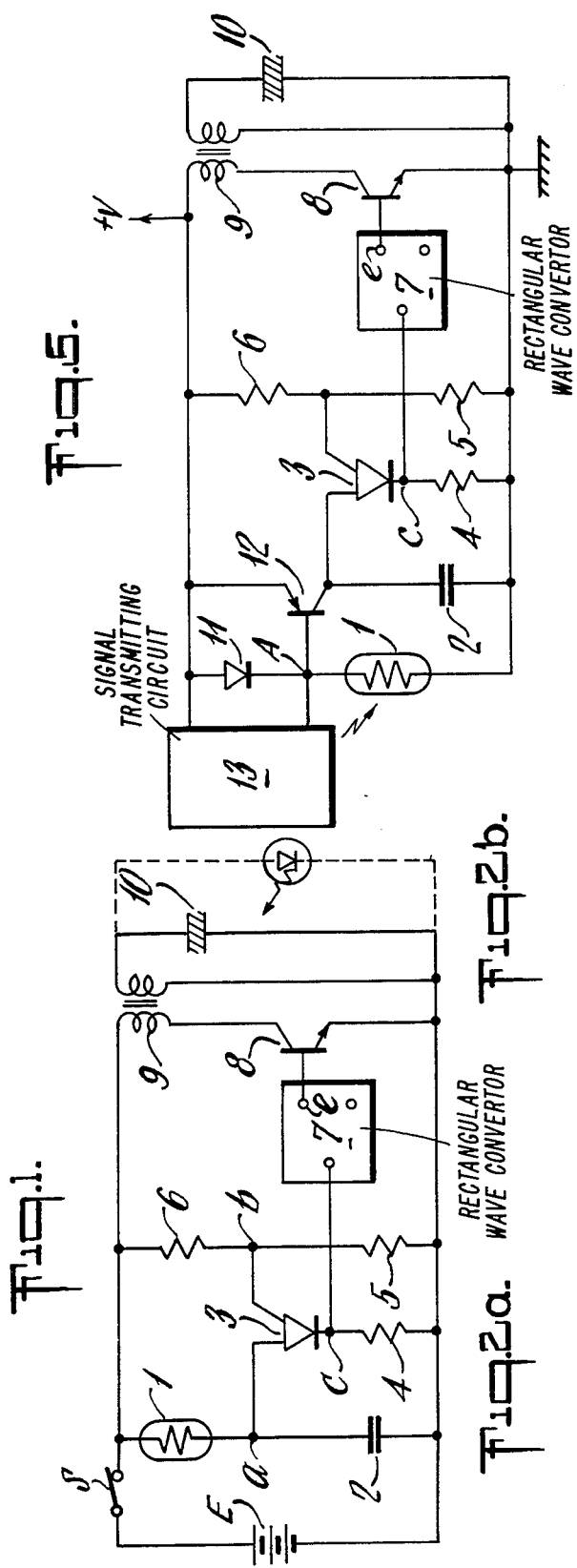
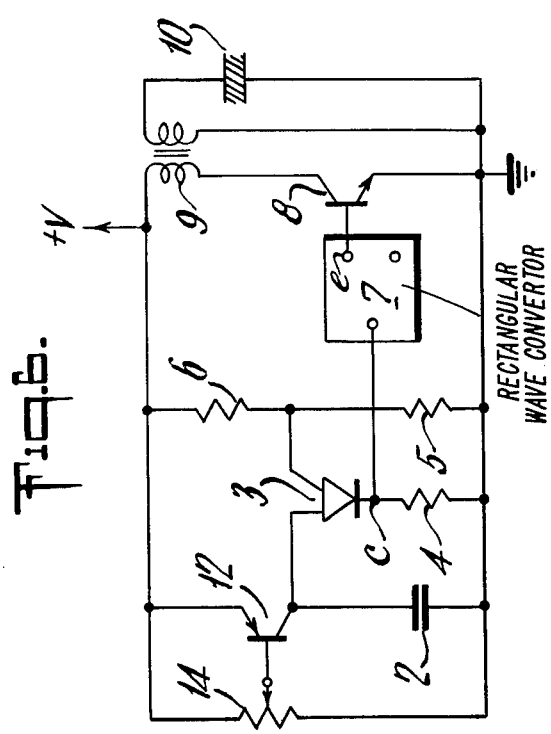
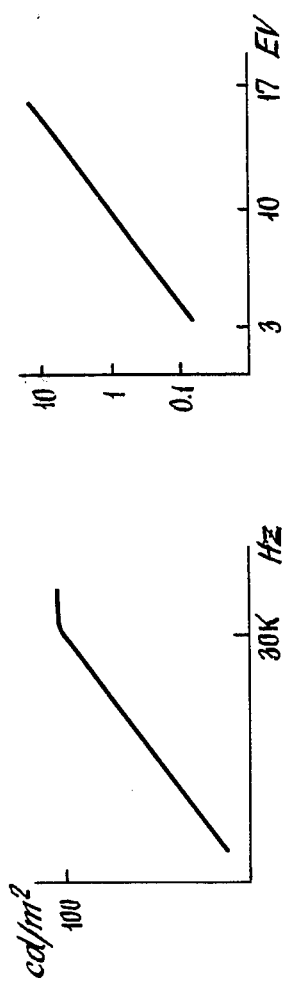

LUMINANCE CONTROLLED INDICATOR IN CAMERA VIEW FINDER

This is a continuation of application Ser. No. 406,745, filed Oct. 15, 1973, now abandoned.

BACKGROUND OF THE INVENTION

The present invention relates to an improved indicating device for use in a camera view finder in which an indicating member including a luminous element such as an electroluminescent device (EL) or a light emitting diode (LED) is used for automatically adjusting the luminance thereof, in association with such finder observable information as brightness of the finder viewed field, the shutter speed, the ASA sensitivity, the value of the diaphram aperture and the value of the distance setting.

In the case of information being indicated by the use of luminous elements such as the electroluminescent device (EL) and the light emitting diode (LED) as described, the luminous intensity of these elements is normally maintained at 300 cd/m$^2$ or thereabout. Since the brightness in the visual field of finder varies from approximately 10,000 to 0.5 cd/m$^2$ in the exposure meter follow-up range (EV17 to EV3 at ASA100), the ratio of luminance between the indicating portion and the image within the finder varies over a very wide range from several tenstimes to one-several hundredth. This results in such drawbacks that the indicating portion becomes illegible because of its excessive darkness, the image in the finder is difficult to see because of too high brightness, or a ghost image appears thus providing light which adversely effects the exposure meter operation. The present invention, in overcoming the above drawbacks provides a luminous indicating device, in which the ratio of luminance between an indicating portion within the finder and the image viewed through the finder is automatically maintained constant so as to establish optimum indication readability and image clarity. Heretofore, such a device is known which controls the luminance intensity of an electroluminescent device using light from the photographic object and in which the signal source of a fixed frequency is connected between the emitter and base of an amplifying transistor, the base thereof being biased through a photoelectric device and the primary coil of a transformer being connected as an electric load to the collector thereof so as to vary the bias voltage depending upon the resistance of the photoelectric device receiving light from the photographic object, thereby controlling the collector current, whereby the electroluminescent device (EL) connected to the transformer is controlled. In such a known device as described, the transistor is used in an unsaturated condition. In other words, the amplitude of the voltage applied to the electroluminescent device is varied, in which case the amplification ratio of the transistor greatly fluctuates depending upon the temperature, and this necessitates the provision of a special circuit for the temperature compensation. Furthermore, in the conventional device, the intensity of the light coming from a photographic object possesses an exponential functional relation to the luminance at the electroluminescent indicating portion. On the contrary, the luminance between the light from a photographic object and the finder image is in a substantially linear proportional relationship. Accordingly, even with a slight fluctuation in the luminance of the finder image which results from a change in the intensity of light from the photographic object, the luminance at the electro-luminescent indicating portion is greatly changed, thus resulting in the illegibility of the finder image and the indicating portion.

SUMMARY OF THE INVENTION

It is a principal object of the present invention to provide a camera with an improved system for providing indications of camera exposure parameters observable through the camera view finder.

Another object of the present invention is to provide an improved luminous indicator observable through a camera view finder.

Still another object of the present invention is to provide an improved luminous indicating device observable through a camera view finder and having a luminance which is automatically regulated with changes in the luminance of the viewed image to provide an optimum relationship between these luminances so that both the indications and the viewed images are clearly observable without mutual interference.

A further object of the present invention is to provide a system of the above nature characterized by its reliability, ruggedness, optimum results, and great versatility and adaptability.

The above and other objects of the present invention will become apparent from a reading of the following description taken in conjunction with the accompanying drawings which illustrate preferred embodiments thereof.

In a sense the present invention comtemplates the provision in a camera including a view finder of a luminous indicator observable through the view finder comprising an electrically energized member for emitting light observable through the view finder, a photosensitive element exposed to light incident on the camera, means responsive to the photosensitive element for generating an electrical signal at a frequency which is a function of the light incident on the photosensitive element and means responsive to the signal generating means for energizing the light emitting member as a function of the signal frequency.

The light emitting member is advantageously an electroluminescent device or a light emitting diode or the like and the photosensitive element is advantageously a photoconductor which forms the resistance component of an RC timing circuit of a relaxation oscillator preferably of the unijunction transistor type or controls another component, such as a transistor which constitutes said resistance component. The output of the relaxation oscillator preferably controls a bi-stable multivibrator whose output controls a switch transistor connected in series with a transformer primary across the power source. The transformer secondary is coupled to the light emitting device. The photosensitive element may be concurrently employed to control an automatic exposure control network. In another embodiment a manually variable resistor is substituted for the photoconductor.

The improved luminous indicating system is automatically regulated and its luminance is related to that of the view finder image so that the indications and image are observable with maximum clarity and readability.

BRIEF DESCRIPTION OF THE DRAWINGS

FIG. 1 is a circuit diagram of an embodiment of the present invention;

FIGS. 2a and b are diagrams illustrating the wave form of outputs produced at points c and e respectively in FIG. 1;

FIG. 3 is a graph of the frequency-luminance characteristic of the electro-luminescent portion;

FIG. 4 is a graph showing the ratio of the luminance at the view finder focal plane to the luminance of the electro-luminescent indicating portion as against the light from the photographic objects in the use of the photoelectric device having Cds $\gamma = 0.5$;

FIG. 5 is a view similar to FIG. 1 of another embodiment of the present invention; and FIG. 6 is a view similar to FIG. 1 of still another embodiment.

DESCRIPTION OF THE PREFERRED EMBODIMENTS

Referring now to the drawings and particularly FIG. 1 thereof which illustrates a preferred embodiment of the present invention, the reference numeral 1 generally designates a photoelectric device or photosensitive element, specifically a photoconductor, which is mounted in the camera, for example, in a single lens reflex camera in which it is exposed to light traversing the camera objective lens that is normally proportional to the light in the viewfinder. The photoelectric device is connected in series with a capacitor 2 to thereby constitute a time constant circuit. Designated at 3 is a programable uni-junction transistor PUT, which, in combination with other elements form a relaxation oscillator. Specifically, when the electric potential at a junction point a between the photoconductive element 1 and a capacitor 2 defining an RC timing circuit is increased to exceed the voltage at a junction point b between fixed resistors 6 and 5, the PUT 3 is rendered conductive to effect the discharge of the capacitor 2, thereby producing output pulses at the ungrounded end c of a resistor 4 connected to the PUT 3. A network 7 connected to the oscillator converts the oscillator output pulses into a rectangular waves. A transistor 8 constituting a switching circuit has a collector connected to the primary of a transformer 9, whose secondary is connected across an electro-luminescent indicating device 10. As explained above, an LED may be substituted, as shown by broken line in FIG. 1, for the electro-luminescent device 10. A battery E powers the above networks and circuits by way of a switch S.

In the operation of the above system when the main power switch S is closed, the capacitor 2 is charged through the photoelectric device 1. When the terminal voltage at the capacitor 2 is increased to exceed the electric potential at the junction point b between fixed resistors 6 and 5, the PUT 3 becomes conductive to allow the capacitor 2 to discharge thereby producing a pulse at the ungrounded end c of resistor 4. Upon completion of the discharge of the capacitor 2, the electric potential at the junction point a is decreased is ground potential, hence the PUT 3 becomes non-conductive. Thus, the above described cycle is repeated to provide oscillation, thereby producing as an output at the point c pulses of the wave form represented in FIG. 2a. The pulses a are converted by a bistable multi-vibrator 7 to pulses in the form of rectangular waves of a duty cycle of 0.5 as shown in FIG. 2b which fed as inputs to the switching transistor 8. The transistor 8 is rendered conductive or non-conductive by the rectangular wave pulses and thereby controls, commensurate to the frequency thereof, the luminance of the electro-luminescent indicating plate 10 through the transformer 9 connected to the collector of transistor 8. The luminance of the electro-luminescent plate 10 varies in proportion to the frequency so far as the frequency is within the range of no more than 30k hertz, as shown in FIG. 3. In the device of the present invention, the transistor 8 is so arranged as to produce an output of a frequency within said range. In the meantime, the oscillation frequency $f$ of the PUT 3 is given by the following formula, assuming the resistance at the photoconductive element 1 as being R, the capacity of the capacitor 2 as being C, the resistance at the resistor 6 as being R2 and the resistance at the resistor 5 as being R1;

$$f = \frac{1}{CR} \times \frac{1}{l_n \frac{(R_1 + R_2)}{R_2}}$$

wherein C, R1 and R2 are constant, and therefore, $$f \, \alpha \, 1/R$$

Now, assume the area illuminance of the photoelectric device is L and if cds $\gamma = 1$ is adopted as the photoconductive element 1, in which $R = KL^{-\gamma}$, in which K is a constant, then $$R \, \alpha \, 1/L$$

Furthermore, supposing that the luminance produced on the focal plane surface of the view finder by the photographic object is B, then $$\frac{1}{L} \alpha \frac{1}{B}$$

$$f \alpha B$$

If the luminance at the electro-luminescent indicating device is Be, then $$Be \, \alpha \, f$$

and therefore, $$Be \, \alpha \, B.$$

Accordingly, the luminance of the electro-luminescent indicating portion is proportional to the luminance at the focal plane surface of the view finder, and thus optimum readability is ensured either at the finder or at the indicating portion, as the predetermined value is kept unchanged. The relaxation oscillation circuit using the programable uni-junction transistor is stable with respect to temperature. In the case of the device according to the present embodiment, the frequency of the oscillation circuit is determined by the photoelectric device 1, the capacitor 2 and the fixed resistors 5 and 6 and is little influenced by temperature change.

The foregoing example is based on cds of $\gamma = 1$. If a cds of $\gamma = 0.5$ is used then the ratio of luminance between the finder image and the electro-luminescent indicating portion will be 13:1 when the luminance at the photographic object is great shown in FIG. 4. On the other hand, when the luminance at the photographic object is small, the luminance ratio will be 1:13, in which case the proportional relationship is not established, but the luminance ratio can be maintained within 1:13 at the most.

FIG. 5 illustrates another embodiment of the present invention, in which the light measuring element of the exposure meter housed in the camera also functions to adjust the luminance of an indicator within the finder, as well. A diode 11 for logarithmic compression use is connected in series with the photoelectric device 1 and constitutes a light measuring circuit. Designated at 12 is a transistor for logarithmic expansion use. With the provision of the transistor 12, the luminance at the photographic object is converted by the photoelectric device 1 to an electric signal, which is logarithmically compressed by the diode 11, and logarithmically expanded by the transistor 12, whereby a current proportional to the luminance at the photographic object flows to the collector of transistor 12. Designated at 13 is an electric circuit for transmitting signals produced at a point A, the junction of photoconductor 1 and diode 11, to a memory circuit, a shutter speed control circuit, an exposure meter circuit or the like. In the circuit, the photoelectric device 1 for controlling the electroluminescent indicating portion need not be specifically provided for this purpose, but may be common to other circuits.

A further embodiment is shown in FIG. 6, in which there is provided a variable resistor 14 adapted to be actuated in cooperation with the value of the diaphragm aperture, the shutter speed and the ASA sensitivity, such that the luminance at the electroluminescent indicating portion 10 is variable in response to these factors. Throughout FIGS. 5 and 6, elements designated by the identical reference numerals with those of FIG. 1 correspond to similarly designated elements and function in like manner in to those in FIG. 1.

In the devices of the three described embodiments, when the circuit 7 is a network such as a mono-stable multi-vibrator adapted to be triggered by a pulse as shown in FIG. 2a and rendered conductive for a given period, the duty cycle of the operating pulse will vary so as to control the luminous diode.

As will be apparent from the foregoing, the ratio of luminance between the electro-luminescent indicating portion and the image portion in the finder is automatically adjusted substantially to a constant value. This advantageously eliminates problems experienced hitherto such as these in which the indicating portion becomes difficult to see because of too low or too high a luminance at the electro-luminescent indicating portion in relationship to the image in the finder, or the image in the finder is obscure, or further, undesirable light resulting from ghosts appears. Accordingly, a ratio of luminance between both portions is maintained constant so as to achieve optimum indicating characteristics. In addition, with the provision of the oscillation circuit controlled by the output of the photoelectric device, the luminous intensity at the electro-luminescent indicating plate is changed by the oscillation frequency thereof, such that the device is stable against the temperature change, without a need to provide a temperature compensation element. This serves to simplify the circuit construction. Furthermore, the luminance of the electro-luminescent indication presents a proportional relationship, over a wide range, to the luminance of an image in the finder. The applicable luminous intensity at the electro-luminescent indicating portion ranges widely from the frequency of lower limit which is the Critical Fusion Frequency (CFF) —i.e. the critical frequency below which flicker of the light source is perceived the frequency of upper limit where the luminous intensity becomes saturated, such that the indicating device of this invention is extremely useful, especially for use as an indicator in a finder of a camera in which a wide range of variation in the brightness is required.

While there have ben described and illustrated a preferred embodiment of the present invention, it is apparent that numerous alterations, omissions and additions may be made without departing from the spirit thereof.

We claim:

1. In a camera including a view finder, a device for controlling the luminance of a frequency responsive luminous indicator observable through said view finder comprising:
    means for generating an oscillating electrical signal to intermittently energize said luminous indicator at a frequency in which said luminous indicator is observed as being continuously energized; and
    means including a photosensitive element exposed to scene light for transmitting the ouput of said photosensitive element to control the camera exposure;
    said generating means including means for varying the frequency of the oscillating signal of said generating means in response to said output of the photosensitive element to increase and decrease said frequency as the scene brightness in the view finder increases and decreases respectively whereby the luminance of the indicator which is observed as continuous is variable in conformity with the scene brightness.

2. The device of claim 1 wherein said generating means comprises means for determining the frequency of said oscillating signal in response to said varying means.

3. The device of claim 1, wherein said generating means comprises an oscillator oscillating at the frequency determined by said determining means and means for energizing said luminous indicator in response to the frequency of the output from said oscillator.

4. The device of claim 3, wherein said oscillator is a relaxation oscillator including an RC network as said determining means for controlling the frequency of the oscillation of said relaxation oscillator.

5. The device of claim 4 wherein the resistance component of said RC network is responsive to said varying means.

6. The device of claim 3, wherein said energizing means comprises a monostable multivibrator controlled by the output from said oscillator.

7. The device of claim 6, wherein said luminous indicator comprises an electroluminescent device.

8. The device of claim 6, wherein said luminous indicator comprises a light emitting diode.

9. The device of claim 3, wherein said energizing means comprises a bistable multivibrator controlled by the output from said oscillator.

10. The device of claim 9, wherein said luminous indicator comprises an electroluminescent device.

11. The device of claim 1, further comprising a transformer intercoupling said generating means and said luminous indicator.

12. The device of claim 11, wherein said generating means comprises a switching transistor connected across a power source in series with said transformer for energizing said luminous indicator through said transformer.

13. The device of claim 1 wherein said luminous indicator comprises an electroluminescent device.

14. The device of claim 1 wherein said luminous indicator comprises a light emitting diode.

15. In a camera including a view finder, a device for controlling the luminance of a light emitting diode indicator observable through said view finder comprising:
 means including a photosensitive element exposed to scene light for transmitting the output of said photosensitive element to control the camera exposure; and
 means for generating an oscillating electrical signal to intermittently energize said light emitting diode at a frequency in which said light emitting diode is observed as being continuously energized;
 said generating means including means for varying the duty cycle of the oscillating signal of said generating means in response to said output of the photosensitive element to increase and decrease said duty cycle as the scene brightness in the view finder increases and decreases respectively, whereby the luminance of said light emitting diode which is observed as continuous emission is variable in conformity with scene brightness.

16. In a camera including a view finder;
 a duty cycle responsive luminous indicator device observable through said view finder for indicating the exposure information;
 means including a photosensitive element exposed to scene light for transmitting the output of said photosensitive element to control the camera exposure; and
 means for controlling the intensity of brilliance of said luminous indicator device, including means for generating an oscillating electrical signal to intermittently/energize said luminous indicator device at a frequency in which said luminous indicator device is observed as being continuously energized said generating means including means responsive to said output of said photosensitive element for varying the duty cycle of the oscillating signal of said generating means to increase and decrease said duty cycle as the intensity of the scene light increases and decreases respectively, whereby the luminous indicator device indicates the exposure information with the intensity of brilliance variable in conformity with the intensity of the scene light.

* * * * *